United States Patent [19]
Gallatin

[11] 3,790,191
[45] Feb. 5, 1974

[54] TRAPEZOIDAL TRAILER HITCH

[76] Inventor: Norman W. Gallatin, 609 S. Capitol, Iowa City, Iowa 52240

[22] Filed: Oct. 7, 1971

[21] Appl. No.: 187,350

[52] U.S. Cl............ 280/456, 280/408, 280/433, 280/476
[51] Int. Cl............................. B62d 53/00
[58] Field of Search 280/460, 456, 459, 446 R, 408, 280/423 A, 493, 406

[56] References Cited
UNITED STATES PATENTS

| 2,444,944 | 7/1948 | Minter | 280/456 R |
| 3,066,953 | 12/1962 | Chosy | 280/408 |
| 3,169,012 | 2/1965 | Fagan | 280/408 |
| 3,421,777 | 1/1969 | Barker | 280/408 |

Primary Examiner—Leo Friaglia

[57] ABSTRACT

A trapezoidal trailer hitch comprising first and second, spaced apart hitch members pivotally connected at their rearward ends to the forward end of the trailer and pivotally connected at their forward ends to the rearward end of a truck or the like.

5 Claims, 8 Drawing Figures

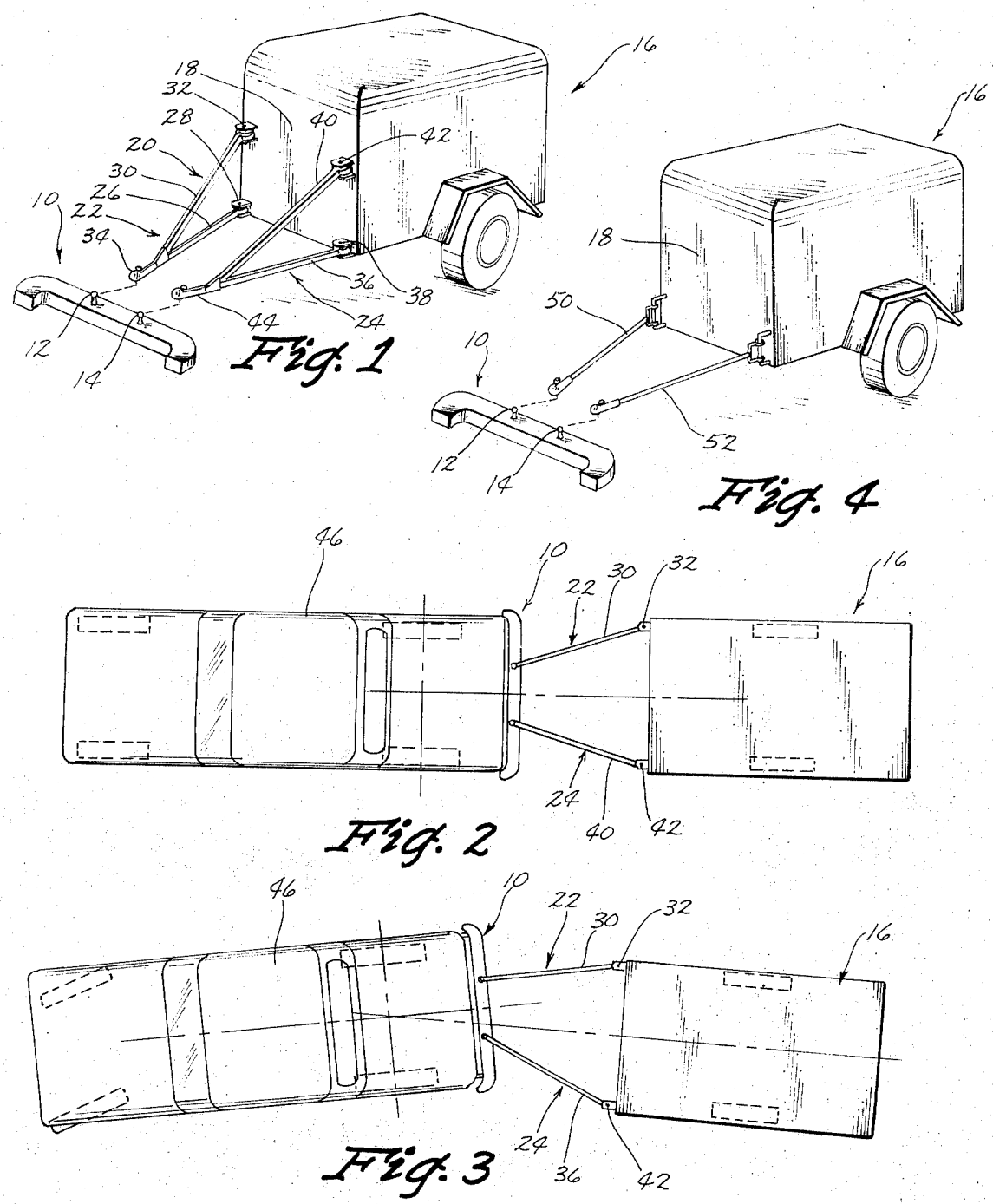

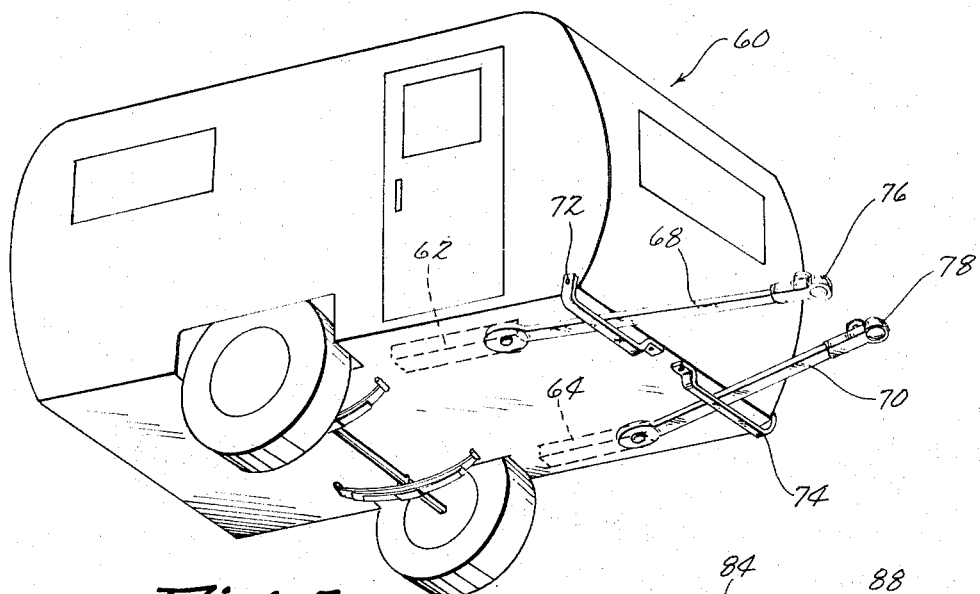
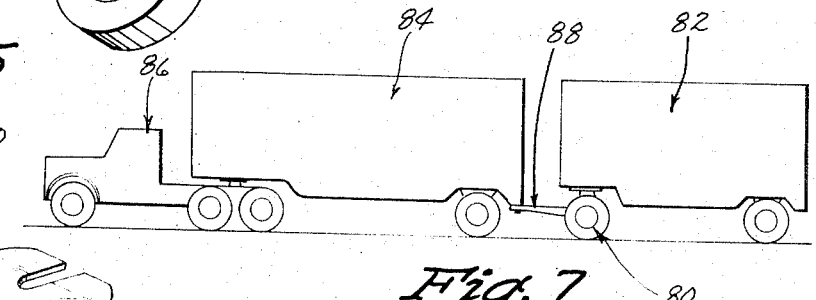
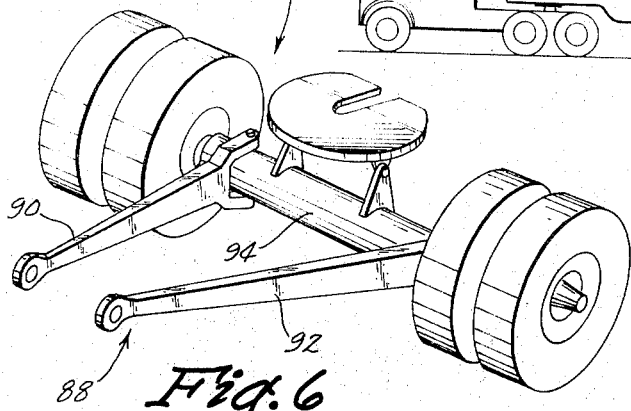
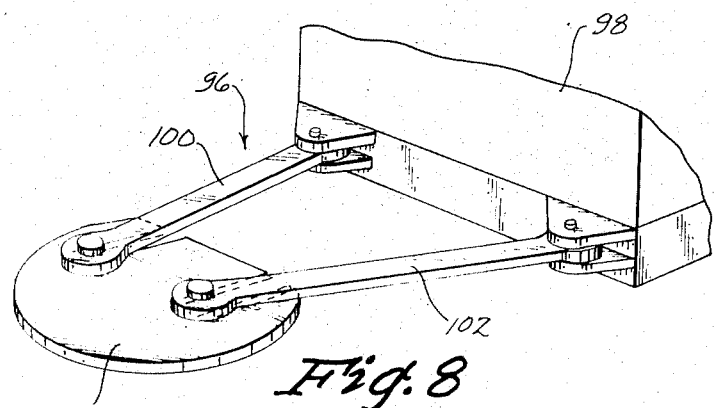

TRAPEZOIDAL TRAILER HITCH

The hitch members extend forwardly and inwardly from their rearward ends and form in plan view a trapezoid with pivoting corners. This geometry creates or defines an apparent pivot point which is located forwardly of the rearward end of the prime mover, and, therefore, located forwardly of the physical pivot points of the hitch. The invention will insure that the trailer and pulling vehicle will not tip or roll sideways independently of each other. In addition, the invention will eliminate trailer sway. These and other advantages of the invention greatly improve the trailing characteristics of the trailer.

The trapezoidal trailer hitch and the apparent pivot point which its geometry creates provides the superior handling qualities and stability normally found with semi truck hitches of the fifth wheel type. This includes the various modifications of the fifth wheel hitch which are described as the horse trailer goose-neck and the coupling installed in the bed of a pickup truck to accommodate large campers. While incorporating these advantages, the trapezoidal hitch also offers the ease of connection and convenience of the conventional hitches at the bumper.

Therefore, it is a principal object of this invention to provide an improved trailer hitch.

A further object of this invention is to provide a trapezoidal trailer hitch.

A further object of this invention is to provide a trapezoidal trailer hitch having increased safety, improved handling qualities, and a high degree of stability for both the trailer and the pulling vehicle.

A further object of this invention is to provide a trapezoidal trailer hitch which counterbalances the detrimental effects which create jack-knifing, trailer sway and difficulty of maneuvering.

A further object of this invention is to provide a trapezoidal trailer hitch which may serve as a coupling between a trailer and a pulling vehicle, or between two trailers, both of which are pulled by a vehicle.

A further object of this invention is to provide a trapezoidal trailer hitch wherein an apparent pivot point is created forwardly of the rear end of the pulling vehicle.

A further object of this invention is to provide a trapezoidal trailer hitch wherein the apparent pivot point thereof moves rearwardly as the vehicle is turned with respect to the trailer to improve handling qualities at low-speed driving.

A further object of this invention is to provide a trapezoidal trailer hitch which eliminates trailer sway.

A further object of this invention is to provide a hitch which will not allow the trailer to tip or roll about its longitudinal axis with respect to the towing vehicle.

A further object of this invention is to provide a trapezoidal trailer hitch which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a front perspective view of a trailer having one form of the trapezoidal hitch secured thereto with only the rear bumper of the pulling vehicle being illustrated;

FIG. 2 is a top plan view of a vehicle pulling a trailer having the trapezoidal hitch of this invention mounted thereon;

FIG. 3 is a view similar to FIG. 2 except that the vehicle has been turned with respect to the trailer;

FIG. 4 is a view similar to FIG. 1 except that a modified form of the hitch has been illustrated;

FIG. 5 is a bottom perspective view of a trailer having a further modified form of the invention provided thereon;

FIG. 6 is a front perspective view of a bogie wheel employing a further modified form of the invention;

FIG. 7 is a side view of a trailer arrangement including the bogie wheel modification of FIG. 6 thereon; and FIG. 8 is a front perspective view of a still further modified form of the invention.

The following definitions of terms will be helpful in understanding the description of the invention:

APPARENT PIVOT POINT

The point on the centerline of the pulling vehicle which the trailer appears to follow. Described geometrically as the locus of the point of intersection of the centerlines of the pulling vehicle and the trailer for all turning angles.

SWAY

A dangerous oscillatory condition which can develop with conventional hitches at the bumper. The swaying trailer changes its turning angle with respect to the pulling vehicle in a resonant fashion. This condition is self-sustaining and may increase in amplitude resulting in loss of control.

ROLL

The tipping or leaning of a trailer or vehicle about its longitudinal axis.

TURNING ANGLE

The angle of the intersection of the longitudinal axis (centerline) of the pulling vehicle and the trailer.

Referring now to FIGS. 1-4, the numeral 10 refers generally to the rear bumper of a pulling vehicle such as a truck or the like having a pair of spaced apart ball hitches 12 and 14 secured thereto in a spaced apart relationship. The numeral 16 refers to a two-wheel type trailer having a forward end 18.

The trapezoidal hitch of this invention is referred to by the reference numeral 20 and comprises hitch members 22 and 24. Hitch member 22 comprises a rigid member 26 which is pivotally connected at its rearward end about a vertical axis to the trailer at 28. Rigid member 30 is pivotally connected at its upper rearward end about a vertical axis to the trailer at 32. The pivotal axes of the rearward ends of the members 26 and 30 are disposed in the same vertical plane. The forward end of member 30 is secured to member 26 as illustrated in FIG. 1. A ball socket means 34 is provided on the forward end of member 26 for conventional attachment to the ball hitch 12.

Hitch member 24 comprises a rigid member 36 pivotally connected at its rearward end about a vertical axis to the trailer at 38. A rigid member 40 is pivotally connected about a vertical axis to the trailer at 42. Forward end of rigid member 40 is secured to member 36 as indicated in FIG. 1. A conventional ball socket means 44 is provided on the forward end of member 36 for connection to the ball hitch 14. The hitch members 22 and 24 extend forwardly and inwardly from their rearward ends as shown in the drawings so that an extension of their longitudinal axes intersects the center line of the truck forwardly of the rearward end thereof which is preferably near the rear axle of the truck. Thus, the trapezoidal hitch creates an apparent pivot point 48 which is located forwardly of the rearward end of the vehicle which causes the trailer to react as though it were actually coupled at a point near to the rear axle of the pulling vehicle. In this manner, the hitch combines the simplicity and convenience of the conventional hitches at the bumper with the superior handling qualities and stability normally found with the elaborate fifth-wheel coupling used by semi-trucks. The trapezoidal configuration of the hitch imparts certain inherent advantages to the hitch not found in existing hitches. The creation of the apparent pivot point as previously described results in superior handling characteristics of the trailer while still allowing the hitch to be attached to the extreme rear of the pulling vehicle. In addition, the trapezoidal geometry of the hitch allows for an automatic shifting of the position of the apparent pivot point at sharp turning angles. This shifting of the apparent pivot point to the rear retains the similar handling qualities of the conventional hitches at the rear bumper at low speed driving and maneuvering without sacrificing the inherent high speed stability of the trapezoidal geometry. In the straight-ahead position of FIG. 2, the apparent pivot point 48 approaches infinity, but it moves quickly to a finite distance from the bumper 10 as soon as any slight angle of turning (FIG. 3) is achieved. The invention consists of two rigid members connected to four pivot points, two points on the trailer and two points on the pulling vehicle. The two hitch members are not parallel but are angled inwardly so that the forward ends thereof are closer together than their rearward ends. The configuration of the two hitch members provides a trapezoid in which all four sides are of constant length while the four angles are free to change relative to each other. The location of the apparent pivot point is a condition which enhances the handling qualities of the trailer when the trailer is being moved in a rearwardly direction. Unlike the conventional bumper type hitch, this invention allows the trailer to be backed with a high degree of control and handling ease, particularly for inexperienced drivers. The trailer utilizing the hitch of this invention has much less tendency to abruptly change attitude with small changes in steering. Very low-speed maneuvering through tight corners, either forward or backward is not sacrificed by the trapezoidal geometry.

FIG. 4 illustrates a modified form of the invention and is substantially identical to the embodiment seen in FIG. 2 except that the upper rigid members have been eliminated therefrom. In FIG. 4, a rigid member 50 is pivotally connected at its rearward end to the forward end of the trailer while a rigid member 52 is pivotally connected at its rearward end to the forward end of the trailer. The members 50 and 52 are pivoted about a vertical axis. The forward ends of the members 50 and 52 are connected to the ball hitches 12 and 14 in conventional fashion. The members 50 and 52 extend forwardly and inwardly from their rearward ends to define the trapezoidal shape such as that described in FIG. 1.

The trailer of FIG. 4 operates in the same manner as the trailer in FIG. 1.

With respect to Fig. 5, the numeral 60 refers to a trailer having frame members 62 and 64 provided on its underside. The trapezoidal hitch of FIG. 5 comprises hitch members 68 and 70 pivotally secured at their rearward ends to frame members 62 and 64 respectively as seen in FIG. 5. The hitch members 68 and 70 extend forwardly and inwardly from their rearward ends and pass through guides 72 and 74 respectively. The forward ends of hitch members 68 and 70 are provided with ball socket means 76 and 78 respectively for connection to ball hitches such as illustrated in FIGS. 1 and 4. The hitch 66 functions in substantially the same manner as the hitches previously described and accomplishes all of the results herebefore enumerated. This arrangement allows the trailer to be closer to the pulling vehicle.

In FIG. 6, a bogie wheel assembly 80 is shown and is ideally suited for use on trailer 82 which is shown in FIG. 7 to be pulled by a trailer 84 and truck 86. The trapezoidal hitch of FIG. 6 is identified by the reference numeral 88 and comprises hitch members 90 and 92 pivotally connected at their rearward ends to the axle housing 94 for articulation about vertical axes. Hitch members 90 and 92 extend forwardly and inwardly from their rearward ends and are adapted to be connected at their forward ends to the rearward end of the trailer 84 for relative horizontal and vertical movement. The hitch 88 functions similarly to the hitches previously described to provide the necessary stability for the rear trailer 82.

FIG. 8 depicts a heavy duty trapezoidal hitch 96 which may be used for connecting a trailer 98 to a fifth wheel 99 of a large truck. Hitch 96 includes hitch members 100 and 102 pivotally secured at their rearward ends to the forward end of trailer 98 and vertically pivotally connected at their forward ends to the fifth wheel 99 which is conventionally supported on the truck for articulation about a transverse horizontal axis. The hitch 96 of FIG. 8 provides a trapezoidal hitch for a truck-trailer combination which also provides the trailing stability previously discussed.

The invention provides roll stability in a manner similar to the semi truck fifth wheel coupling which is a further advantage over conventional hitches located at or near the rear bumper and employing a single ball type coupling. Roll stability insures that the trailer cannot tip or lean independently of the towing vehicle. The primary feature of the invention which provides roll stability is the design of the pivot points located at the front of the trailer and at the rear of the trapezoidal hitch. These two pivots are free to move only in the horizontal direction and not in the vertical direction. The vertical movement restriction of these pivots holds the trailer in the same roll attitude as that of the pulling vehicle at all times.

It should be noted that the basic trapezoidal configuration of the invention allows a high degree of design freedom to control the behavior of the trailer. By constructing the pivots at the front of the trailer in such a way that their axes are not at true vertical but are angled inwardly a slight amount, a small degree of roll can be purposely introduced into the trailer's attitude during turning. This feature may be advantageous for certain trailer applications which will not be described here.

As in the other forms of the invention, the hitch members 100 and 102 extend forwardly and inwardly from their rearward ends to their forward ends.

Thus it can be seen that the trailer hitches of this invention accomplish at least all of their stated objectives.

I claim:

1. In combination:
   a. a vehicle having a rearward end,
   b. a trailer means having a forward end,
   c. a trapezoidal hitch means connecting said trailer means and said vehicle, including first and second hitch members having rearward and forward ends,
   d. said hitch members pivotally secured at their rearward ends to said trailer means and pivotally connected at their forward ends to said vehicle for vertical and horizontal movements, said hitch members extended forwardly and inwardly from their rearward ends with the forward ends thereof spaced apart, and
   e. said hitch members pivotally connected to said trailer means about axes positioned in a common vertical plane extended transversely of said trailer means and laterally inclined with respect to a corresponding vertical axis in said plane so that a predetermined degree of roll can be induced to said trailer means relative to said vehicle when said trailer means is turned with respect to said vehicle.

2. In combination:
   a. a vehicle having a rearward end,
   b. a trailer means having a forward end,
   c. a trapezoidal hitch means connecting said trailer means and said vehicle,
   d. said hitch means including a pair of transversely spaced hitch members having forward and rearward ends with the forward ends thereof spaced apart a distance less than the rear ends thereof,
   e. means movably connecting the forward ends of said hitch members to said vehicle for relative vertical and horizontal movement, and
   f. means pivotally connecting the rearward ends of said hitch members to the forward end of said trailer means with the rearward end of one of said hitch members having pivotal movement only about an upright axis located in a vertical plane extended transversely of said trailer means.

3. The combination of claim 2 wherein:
   a. said trailer means is of a two wheel type, and
   b. said means for movably connecting the forward ends of said hitch members comprise coacting ball and socket connectors, and
   c. the rearward end of each of said hitch members is pivotally movable only about an upright axis located in a common vertical plane extended transversely of said trailer means.

4. The combination of claim 3 wherein:
   a. the rearward ends of said hitch members are pivotally connected to said trailer means at positions spaced rearwardly of the forward end of said trailer means.

5. In combination:
   a. a vehicle having a first trailer means with a rearward end,
   b. a second trailer means having a forward end,
   c. said second trailer means having a bogie wheel assembly pivotally mounted at the forward end thereof for horizontal pivotal movement, said bogie wheel assembly including a pair of spaced apart wheel means having a connecting support extended therebetween,
   d. a trapezoidal hitch means connecting said second trailer means and said first trailer means,
   e. said hitch means including a pair of transversely spaced hitch members having forward and rearward ends with the forward ends thereof spaced apart a distance less than the rear ends thereof,
   f. means movably connecting the forward ends of said hitch members to said first trailer means for relative vertical and horizontal movement, and
   g. means pivotally connecting the rearward ends of said hitch members to said support with the rearward end of one of said hitch members having pivotal movement only about an upright axis located in a vertical plane extended transversely of said second trailer means.

* * * * *